United States Patent [19]

Taylor et al.

[11] 4,443,379

[45] Apr. 17, 1984

[54] SOLID BLEACHING COMPOSITION FOR EDIBLE OILS

[75] Inventors: Dennis R. Taylor, Covina; Zenon Demidowicz, Los Angeles, both of Calif.

[73] Assignee: Harshaw/Filtrol Partnership, Oakland, Calif.

[21] Appl. No.: 358,995

[22] Filed: Mar. 17, 1982

[51] Int. Cl.[3] .......................... C11B 3/06; C11B 3/00; C09F 5/10

[52] U.S. Cl. .................................... 260/427; 260/420; 260/428; 502/65; 502/68

[58] Field of Search ........................ 260/427, 420, 428; 252/455 Z

[56] References Cited

U.S. PATENT DOCUMENTS

| | | | |
|---|---|---|---|
| 2,418,819 | 4/1947 | Coggins et al. | 260/427 |
| 2,639,289 | 5/1953 | Vogel | 260/427 X |
| 3,036,102 | 5/1962 | Pons et al. | 260/420 X |
| 3,895,042 | 7/1975 | Taylor | 260/428 X |
| 3,954,819 | 5/1976 | Husch | 260/428 |
| 3,955,004 | 5/1976 | Strauss et al. | 260/427 X |
| 3,976,671 | 8/1976 | Husch | 260/428 |
| 4,048,205 | 9/1977 | Neuzil et al. | 260/428 |
| 4,066,677 | 1/1978 | de Rosset et al. | 260/420 X |
| 4,100,108 | 7/1978 | Alafandi et al. | 252/455 Z |
| 4,142,995 | 3/1979 | Alafandi et al. | 252/455 Z |
| 4,242,237 | 12/1980 | Gladrow et al. | 252/455 Z |
| 4,253,989 | 3/1981 | Lion et al. | 252/455 Z |
| 4,259,212 | 3/1981 | Gladrow et al. | 252/455 Z |
| 4,325,847 | 4/1982 | Lim et al. | 252/455 Z |
| 4,333,857 | 6/1982 | Lim et al. | 252/455 Z |

FOREIGN PATENT DOCUMENTS

| | | | |
|---|---|---|---|
| 1224367 | 3/1971 | United Kingdom | 260/427 |

OTHER PUBLICATIONS

Breck, Zeolite Molecular Sieves, John Wiley & Sons, Inc., pp. 176, 177, 536, 537, 540, 542, 544, 548, 549 & 551 to 554, (1974).

Swern, Bailey's Industrial Oil & Fat Products, Intersc. Publ., N.Y., 3rd Edition, pp. 771–781, (1964).

*Primary Examiner*—Helen M. S. Sneed

*Attorney, Agent, or Firm*—Andrew E. Barlay

[57] ABSTRACT

A composition useful for the adsorptive bleaching of edible oils, particularly of vegetable oils, is disclosed. The composition consists essentially of a major portion of bleaching clay and a minor portion of an alumino-silicate zeolite preferably of the faujasite-type structure. The zeolite used has its base exchange sites occupied by alkaline earth metal and/or transition metal cations, wherein the transition metal cations employed exclude those of the Group VIII metals. Preferably, the zeolite is a calcium-, magnesium-, or lanthanum-exchanged Y-zeolite. The presence of the zeolite in the bleaching composition significantly improves the removal of free fatty acids from the oil while permitting simultaneous removal of color impurities.

9 Claims, 2 Drawing Figures

SOLID BLEACHING COMPOSITION FOR EDIBLE OILS

FIELD OF THE INVENTION

This invention relates to bleaching clay compositions and, in particular, to bleaching clay compositions that produce a finished oil having a low free fatty acid content.

BRIEF STATEMENT OF THE PRIOR ART

Vegetable oils, such as edible oils, are commonly treated with bleaching clays which adsorb the color impurities of the oil. This treatment is usually the last step of purification of the oil and is commonly referred to as a polishing or finishing treatment. Prior to this treatment, the oil is commonly refined with sodium hydroxide to remove phosphatides and free fatty acids, the latter producing soapstock which is removed by centrifuging the treated oil. Any residual soap in the oil is removed by water washing and centrifuging the washed oil.

The color impurities, such as carotenoids, i.e., carotenes, xanthophylls, carotenoid acids and xanthophyll esters, chlorophill, and tocopherols are inert to alkali refining and remain in the refined oil. These color impurities are removed by treatment of the oil with a bleaching clay which has an adsorption capacity for the color impurities.

The adsorptive bleaching of an oil is usually performed by mixing from 0.25 to 5 weight percent bleaching clay with the oil at the temperature from 75 to about 125 degrees C. for 5 to 30 minutes. This treatment is often performed under vacuum to preclude oxidation of the oil. The oil is then cooled and filtered in a filter press.

Fuller's earth and acid-treated sub-bentonites have been used as bleaching clays for this treatment since these clays have an adsortive capacity for color impurities in oils. The acid-treated sub-bentonites are most commonly used for this purpose since they have the highest adsorptive capacity.

The refined and treated oils frequently retain a residual free fatty acid content which is objectionable and further refining or treatment is often desirable.

A recent patent, U.S. Pat. No. 3,954,819, suggests the removal of free fatty acids from used cooking oils with a sodium X-type alumino-silicate zeolite and diatomaceous earth as a filter aid. Unfortunately, alumino-silicate zeolites tend to decrease the bleaching activity of the clay and the quantity of molecular sieve or zeolite that can be combined with a bleaching clay is limited by the need for effective removal of the color impurities during the finishing treatment of the oil.

BRIEF STATEMENT OF THE INVENTION

A solid bleaching composition consisting essentially of a major portion of clay and a minor portion of a faujasite-type alumino-silicate zeolite is provided for the bleaching of vegetable oils and simultaneous removal of color impurities from the oil. The clay is characterized as being an acid-activated sub-bentonite type clay, while the faujasite-type zeolite has its base exchange sites occupied by alkaline earth metal and/or transition metal cations, wherein the transition metal cations utilized exclude those metals which belong to Group VIII of the Periodic Table. The bleaching composition contains from about 75 to about 95% by weight acid-activated sub-bentonite clay and from about 5 to about 25% by weight zeolite.

(b) is a 10–90% by weight blend of acid-activated clay and La-Y zeolite; and (c) is an acid-activated clay with no zeolite addition.

Figure 2:
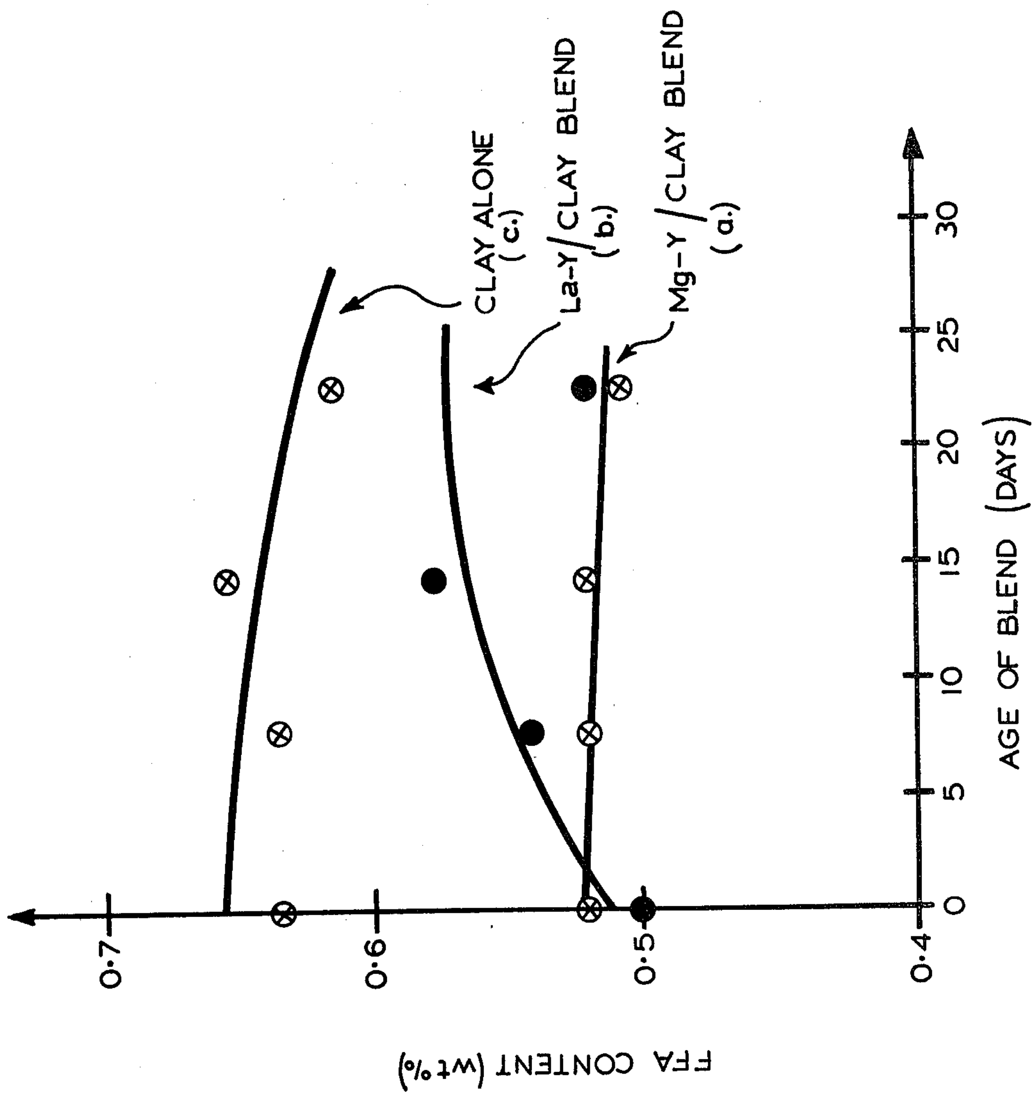

FIG. 2 shows the free fatty acid adsorption capacity of the above clay-zeolite blends and clay alone.

DESCRIPTION OF PREFERRED EMBODIMENTS

The Bleaching Clay Component

The bleaching clay which is combined with a metal-exchanged alumino-silicate zeolite to form the bleaching composition of this invention can be any of the clays which, in a natural or acid-activated state, will adsorb color impurities from oils. These are commonly classified as sub- or metal-bentonites and fuller's earths. While acid activation is a necessary pretreatment of the sub-bentonites, fuller's earths have a natural adsorption capacity for color bodies.

Fuller's earths are chiefly montmorillonite and attapulgite with lesser amounts (below about 10 weight percent) of kaolinite, halloysite and illite, and non-clay materials, such as amorphous silica, quartz, amphibole and biotite. Montmorillonite is the major (over 70 weight percent) component of the sub-bentonites. Other clay components of this class are saponite, hectorite, nontronite andbeidellite. Non-clay materials which can be present, depending on the source of the clay, are: calcium carbonate, quartz, gypsum and feldspar. These clays are found in Florida, Georgia, Texas, Illinois, California, Nevada, Alabama, South Carolina, Arkansas, and South Dakota.

The sub-bentonite clays are found in Arizona, Mississippi, California, New Mexico, North Dakota, Nevada, Olkahoma, Colorado, Utah and Texas. These clays are treated with a strong mineral acid and employed as the major component of the bleaching solid composition of the invention. Any of the sub-bentonites, which are characterized by slight swelling and a low ratio of sodium to calcium can be used. These clays are chiefly montmorillonite with other clays components including saponite, kaolinite, hectorite, etc., and non-clay components, such as calcium carbonate, quartz, gypsum, etc.

The acid activation of sub-bentonite clays to prepare bleaching clays is well known. A continuous method for acid activation is described in U.S. Pat. No. 2,563,977, the disclosure of which is incorporated herein by reference. Typically the clay is produced by crushing of mined clay in primary roll or hammer crushers to a size of about ½ inch. The crushed clay is dried partially to reduce its moisture content to less than about 10 percent and the partially dried clay is then further ground to less than about ¼ inch largest particle diameter. The clay is formed into an aqueous slurry, from 20 to about 45 percent solids, and is contacted with sulfuric acid at an acid-to-clay weight ratio from 1:1 to about 1:3. The acidified mixture is heated to atmospheric boiling temperature and is maintained at that temperature for about 2–10 hours under constant agitation. Following the acid treatment, the clay suspension is concentrated in a thickener in countercurrent flow to wash water to obtain a slurry of acid-activated clay washed of soluble salts and excess sulfuric acid. This slurry is further concentrated by filtration or evaporation, usually resulting in production of a filter cake which is then dried to a moisture content of less than about 15 weight percent. The dried material is pulverized in a hammer mill commonly provided with an air classifier to obtain a desirable size range of particles, typically, particles passing a 60 mesh and retained on a 200 mesh screen.

The acid treatment of the clay is discontinued before the basic structure of the clay is altered and generally is sufficient to replace the exchangeable cations with hydrogen and to leach a portion of the aluminum, ferric and magnesium ions from the clay lattice. Usually, the acid treatment is performed with an aqueous suspension or slip of clay and the activated clay is recovered by thickening and filtering, and the filter cake is dried and pulverized. Alternatively, a paste of acid, clay and water can be prepared and extruded into pellets which can be heated to the necessary treatment temperature and the resulting activated clay can be dried and pulverized.

The Zeolite Component

The alumino-silicate zeolites which are combined with the acid-activated sub-bentonite clays as the bleaching solid composition of the invention are crystalline structures of silica and alumina and in particular are zeolites of the faujasite type, i.e., zeolite X and zeolite Y. The alumino-silicate zeolites which are useful are those which are ion-exchanged with cations of one or more transition series metals, such as zinc, manganese, copper, chromium, vanadium, titanium, lanthanides, or alkaline earth metals, such as calcium, magnesium, barium, strontium, preferably calcium or magnesium. Cations of Group VIII transition metals were found to be unsuitable for the purposes of this invention. The suitable zeolites have pore diameters typically about 7.4 Angstroms with pore volumes about 0.35 cubic centimeters per gram and ion exchange capacities from about 3.8 to about 7 milliequivalents per gram. The zeolites have the following molecular ratios of $Na_2O$:$SiO_2$:$Al_2O_3$;

Zeolite X 1:3:1

Zeolite Y 1:4.5:1

The faujasite-type alumino-silicate zeolites are commonly designated as X and Y zeolites and of these, the Y zeolite is most preferred. The X zeolite and a method for its preparation are described in U.S. Pat. No. 2,882,244 and the Y zeolite and a method for its preparation are described in U.S. Pat. No. 3,216,789. The X and Y zeolites are commercially available.

As commonly prepared, the sodium content of the alumino-silicate zeolites is high, typically from about 10 to about 15 weight percent, expressed as sodium oxide. For maximum effectiveness is combination with a bleaching clay to form the bleaching composition of the invention, the sodium content of the alumino-silicate zeolite should be reduced to lower levels, preferably to less than about 5 weight percent, preferably to a value in the range from about 2 to about 3.5 weight percent, by exchange of the sodium ions associated with the alumino-silicate zeolite with cations of one or more alkaline earth metals, lanthanides or the above referred to transition series metals. Of these, the alkaline earth metals and lanthanides are preferred, and of this preferred class, most preferred are calcium, magnesium and lanthanum. The sodium content of the alumino-silicate zeolites can be reduced to the desired levels by exchange with an aqueous solution of a salt of the selected metal at relatively mild temperatures, e.g., temperatures of about 102 degrees C. (215 degrees F.) or less in the manner described in U.S. Pat. No. 3,677,698. More complete reduction of the sodium content, e.g., to values less than 1 weight percent can be practiced if desired; however, the treatment to effect a more complete removal of the sodium must be practiced under more drastic conditions, using elevated temperatures and superatomospheric pressures, typically temperatures from about 149 degrees to about 260 degrees C. (300 degrees to about 500 degrees F.) with sufficient pressure to maintain liquid phase conditions, and at equivalent weight ratios of the exchange cation to sodium of 20:1 to 100:1.

The zeolite component of the solid bleaching composition is dehydrated, pulverized and screened to obtain a suitably sized fraction (passing a 200 mesh sieve, preferably passing a 325 mesh screen) and is blended with the acid-activated sub-bentonite clay to prepare the bleaching solid composition of the invention. The composition can then be packaged and stored for subsequent use in the bleaching treatment of edible oils.

The Bleaching Solid Composition

The bleaching solid composition of the invention employs a major quantity, from 75 to about 95 weight percent of the bleaching clay, which is the aforementioned acid-activated sub-bentonite clay and a minor quantity, from 5 to about 25 weight percent, of the metal-exchanged crystalline alumino-silicate zeolite. Preferably, the clay comprises from 85 to 93 weight percent and the zeolite comprises from 7 to 15 weight percent of the solid bleaching composition. The solid composition will typically be prepared, stored and handled for a period greater than one week and usually greater than several weeks prior to its use. Accordingly, it is important that the composition be stable and retain its decolorization and its free fatty acid adsorption capacity for extended storage periods. It has been found that the composition of this invention wherein the sodium content of the zeolite has been reduced by exchange with an alkaline earth metal or non-Group VIII first transition series metal has the desired storage stability.

The Oil Treatment

The vegetable oils which are treated with the bleaching solid composition are oils with which commonly have been refined by treatment of the fresh vegetable oil with an alkali metal hydroxide, typically, sodium hydroxide, to remove the free fatty acids. This treatment, however, does not remove the color impurities in the oil which are present from various plant pigments. Typical of the pigments present in oils are the carotenoids which are the yellow and red pigments of the oil. These include carotenes (which are hydrocarbons), xanthophylls (which are oxo or hydroxo derivatives of the carotenes), carotenoid acids and xanthophyll esters. The carotenoids are highly unsaturated compounds and range in color from yellow to deep red. Also present as color impurities are chlorophyll and tocopherols which are light yellow impurities which, upon oxidation, form red-colored impurities.

The aforedescribed color impurities of the vegetable oils are removed by treatment with the bleaching solid composition of the invention without significantly increasing the free fatty acid content of the vegetable oil. The vegetable oil is treated by mixing the solid in the oil, at concentrations from about 0.5 to about 50 volume percent solid, preferably from about 5 to about 30 volume percent solid, heating the mixture to a temperature from 80 to about 180 degrees C., and maintaining that temperature while stirring the mixture for 10 to 30 minutes. At the aforementioned proportions of solid to oil and the concentrations of zeolite used in the bleaching solid composition of the invention, the oil is thus treated with from 0.025 to 25, preferably from 0.25 to 7.5, volume percent of the zeolite. Thereafter the mixture is cooled and filtered, usually in a filter press to remove the solids. In a preferred treatment, the vegetable oil is contacted with the solid under vaccum to prevent oxidation of the oil during the elevated temperature treatment. This can be performed in a vacuum autoclave which has a mechanical agitator, such as a propeller mixer and the necessary heating and cooling coils to maintain the desired temperature. The treatment in the autoclave can be performed at subatmospheric pressure, typically at a vaccum from about 63.5 to about 76.2 centimeters (25 to 30 inches) of water using a steam ejection. Upon completion of the reaction, the mixture is cooled to ambient temperature, vented to atmospheric pressure and then filtered in a filter press. This treatment can also be performed in a continuous flow system with appropriate equipment.

The invention will be described with reference to the following examples which will also serve to demonstrate the results obtainable therewith.

EXAMPLE I

A series of metal-exchanged Y zeolites were prepared using the following procedure. Samples of crystalline, alumino-silicate Y-zeolites were treated with aqueous solutions of the desired exchange ion according to the following general procedure. The sodium Y zeolite was dispersed in an aqueous solution of a nitrate, sulfate or chloride salt of the exchange cation in distilled water using the concentrations, in grams per milliliter, shown in Table 1. The exchanges were each performed in multiple contacting treatments, shown in Table 1 and the pH of the exchange solutions and identities of the salts used are also shown in Table 1 . The exchange treatments were performed at ambient temperature.

TABLE 1

| Zeolite | pH | Zeolite Conc. | Salt Conc. | No. of Exchs. | Salt Used |
|---|---|---|---|---|---|
| CaY | — | 0.11 | 0.09 | 4 | $CaCl_2.2H_2O$ |
| MgY | 5 6 | 0.11 | 0.13 | 3 | $MgCl_2.6H_2O$ |
| BaY | 5.0 | 0.02 | 0.05 | 3 | $Ba(NO_3)_2$ |
| MnY | 4.5 | 0.07 | 0.09 | 3 | $MnSO_4.H_2O$ |
| ZnY | 4.5 | 0.07 | 0.09 | 3 | $ZnCl_2$ |
| LiY | 5.5 | 0.11 | 0.11-0.05 | 5 | LiCl |
| KY | 5.5 | 0.12 | 0.1; 0.08 | 1 | KCl; KOH |
| NiY | 5.0 | 0.08 | 0.11-0.07 | 4 | $NiSO_4.6H_2O$ |
| FeY | 4.5 | 0.13 | 0.19 | 3 | $FeSO_4.7H_2O$ |
| CoY | 5.0 | 0.07 | 0.09 | 3 | $CoCl_2.6H_2O$ |
| $NH_4Y$ | 5.3 | 0.12 | 0.07 | 3 | $NH_4Cl$ |

In the preceding potassium exchange, potassium chloride was used initially, followed by potassium hydroxide.

After this contacting, the resultant slurry was filtered, and the filtered solids were washed with distilled water until free of soluble nitrate, sulfate or chloride. The filtered and washed solids were sampled and analyzed for silica, alumina, sodium and exchanged-cation contents. The composition of each of the exchange Y zeolites is set forth in the following table:

TABLE 2

| Zeolite | $SiO_2$ | $Al_2O_3$ | $Na_2O$ | MO* | $SiO_2/Al_2O_3$** |
|---|---|---|---|---|---|
| CaY | 66.7 | 24.5 | 3.94 | 8.88 | 4.62 |
| MgY | 65.7 | 22.2 | 3.76 | 6.06 | 5.01 |
| BaY | 55.5 | 18.8 | 2.64 | 21.5 | 5.02 |
| MnY | 63.1 | 24.9 | 3.64 | 9.53+ | 4.30 |
| ZnY | 63.5 | 23.0 | 3.17 | 10.8+ | 4.69 |
| NaY | 62.8 | 24.2 | 12.8 | — | 4.40 |
| LiY | 69.5 | 24.0 | 3.44 | 4.04 | 4.92 |
| KY | 63.7 | 20.9 | 0.27 | 16.5 | 5.17 |
| NiY | 65.4 | 21.6 | 3.51 | 8.65+ | 5.14 |
| FeY | 62.4 | 22.3 | 3.23 | 10.7++ | 4.75 |
| CoY | 61.5 | 24.9 | 3.04 | 9.26 | 4.19 |
| $NH_4Y$ | 68.4 | 20.8 | 3.63 | 6.04+++ | 5.58 |

*Metal oxide weight percent
**Mol ratio, all other values in weight percent
+Calculated as the metal
++Calculated as $Fe_2O_3$
+++Calculated as $NH_3$

EXAMPLE 2

Each of the exchanged Y alumino-silicate zeolites and a representative sample of the sodium Y alumino-silicate zeolite were employed in the treatment of a vegetable oil containing about 0.6 weight percent oleic acid. The oil was treated by admixing about 50 grams of the oil with 5 grams (volatile-free) of the zeolite (sieved through 200 mesh sieve) under investigation. The treatment was performed according to a method analogous to that of AOCS official method Cc 8a-52. The mixtures of oil and alumino-silicate zeolite were stirred vigorously, heated to 120 degrees C. for a period of 5 minutes and maintained at that temperature for an additional 5 minutes.

Thereafter, the resultant mixtures were poured from the refining cup onto dry filter paper and filtered to obtain samples of treated oil. These samples were analyzed for free fatty acids according to the AOCS official method Ca 5a-40. The results of the treatments with the metal-exchanger Y zeolites are set forth in Table 3 which reports the quantities of the oleic acid adsorbed by the zeolites as a percentage of the oleic acid originally present in the oil and as the number of grams adsorbed per 100 grams of zeolite.

TABLE 3

| Zeolite | Vm | Initial Oleic Acid Present In Oil grams/100 gm. Oil | Oleic Acid Adsorbed From Oil | Percent Oleic Acid Adsorbed From Oil | Grams of Oleic Acid Adsorbed Per 100 gm. Zeolite |
|---|---|---|---|---|---|
| CaY | 26.2 | 0.59 | 0.40 | 67.8 | 8.0 |
| MgY | 24.1 | 0.57 | 0.47 | 82.5 | 9.4 |
| BaY | 22.0 | 0.57 | 0.39 | 68.4 | 7.8 |
| MnY | 18.9 | 0.57 | 0.38 | 66.7 | 7.6 |
| ZnY | 19.4 | 0.57 | 0.37 | 64.9 | 7.4 |
| NaY | 23.5 | 0.59 | 0.30 | 50.9 | 6.0 |
| LiY | 17.6 | 0.59 | 0.34 | 57.6 | 6.8 |
| KY | 21.2 | 0.59 | 0.21 | 35.6 | 4.2 |
| NiY | 24.6 | 0.59 | 0.27 | 45.8 | 5.4 |
| FeY | 19.9 | 0.59 | 0.07 | 11.9 | 1.4 |
| CoY | 21.2 | 0.57 | 0.34 | 59.7 | 6.8 |
| $NH_4Y$ | 22.6 | 0.59 | 0.12 | 20.3 | 2.4 |

The experiments demonstrate that the ammonium and most of the Group VIII metal-exchanged Y zeolites are relatively ineffective in removal of free fatty acid from the oil. A low activity was also observed for the alkali metal-exchanged Y zeolites since the potassium, lithium and sodium forms of the Y-zeolite removed about 60 percent or less of the free fatty acid. In contrast, the Y-zeolite exchanged with alkaline earth metals, particularly calcium, barium and magnesium, was effective in removing a major proportion of the free fatty acid. This greater activity was also observed for the manganese-exchanged and zinc-exchanged Y zeolite, demonstrating that the enhanced activity is also shared by Y zeolite exchanged with some of the non-Group VIII first transition series metals.

EXAMPLE 3

In this example, samples of a magnesium-exchanged and a sodium Y zeolite were admixed with an acid-activated sub-bentonite bleaching clay in proportions of 10 percent zeolite and 90 percent clay. A refined vegetable oil, soya oil, was spiked with 0.59 weight percent oleic acid and the oil (100 grams) was treated with the blend of zeolite and bleaching clay (10 grams) following the procedure described in the previous example. Samples of the oil followinng this treatment were analyzed for their free fatty acid contents and were inspected for color, using the AOCS method Ce 13b-45 and the results are reported in Table 4 as weight percent free fatty acid, calculated as oleic acid, remaining in the oil after treatment and as a Lovibond Red number of the treated oil.

TABLE 4

| | Bleaching Composition | | |
|---|---|---|---|
| Zeolite | Clay | Lovibond Red No. | FFA[1] |
| 10% MgY | 90% | 0.66 | 0.48% |
| 10% NaY | 90% | 0.92 | 0.51% |
| none | 100% | 0.56 | 0.60% |
| none | none | too dark[2] | 0.59% |

[1]Free fatty acid, calculated as oleic acid
[2]The untreated oil was too dark to obtain a reading.

The preceding example demonstrates that the blend of the magnesium Y zeolite and clay was more effective in reduction of the free fatty acid content of the oil than the sodium Y zeolite and, significantly, did not substantially affect the bleaching activity of the clay. in contrast, the sodium Y zeolite substantially reduced the efficiency of the clay for removal of the color impurities as evidenced by higher (darker) Lovibond Red number readings for the oil using this blend as compared to the results obtained with the unbleached clay or the magnesium Y-zeolite/clay blend.

EXAMPLE 4

Blends of 10 weight percent of each of the magnesium and sodium zeolites with a bleaching clay were prepared and tested for bleaching and free fatty acid removal when freshly prepared and at weekly intervals thereafter to determine the stability of the blends.

The results which were obtained are shown in the following Table 5

TABLE 5

| Test Day | Zeolite | Clay | Lovibond Red No. | FFA |
|---|---|---|---|---|
| 0 | 10% MgY | 90% | 0.66 | 0.48% |
| 0 | 10% NaY | 90% | 0.92 | 0.51% |
| 7 | 10% MgY | 90% | 0.62 | 0.47% |
| 7 | 10% NaY | 90% | 0.92 | 0.46% |
| 14 | 10% MgY | 90% | 0.64 | 0.49% |
| 14 | 10% NaY | 90% | 1.15 | 0.49% |
| 21 | 10% MgY | 90% | 0.68 | 0.46% |

TABLE 5-continued

| Test Day | Zeolite | Clay | Lovibond Red No. | FFA |
|---|---|---|---|---|
| 21 | 10% NaY | 90% | 0.97 | 0.48% |

Again, the superior performance of the magnesium Y-zeolite/clay blend relative to the sodium Y-zeolite/-clay blend is demonstrated by the fact that lower (lighter) Lovibond Red numbers were obtained for the magnesium Y-zeolite/clay blend and generally lower free fatty acid contents.

EXAMPLE 5

Figure 1:
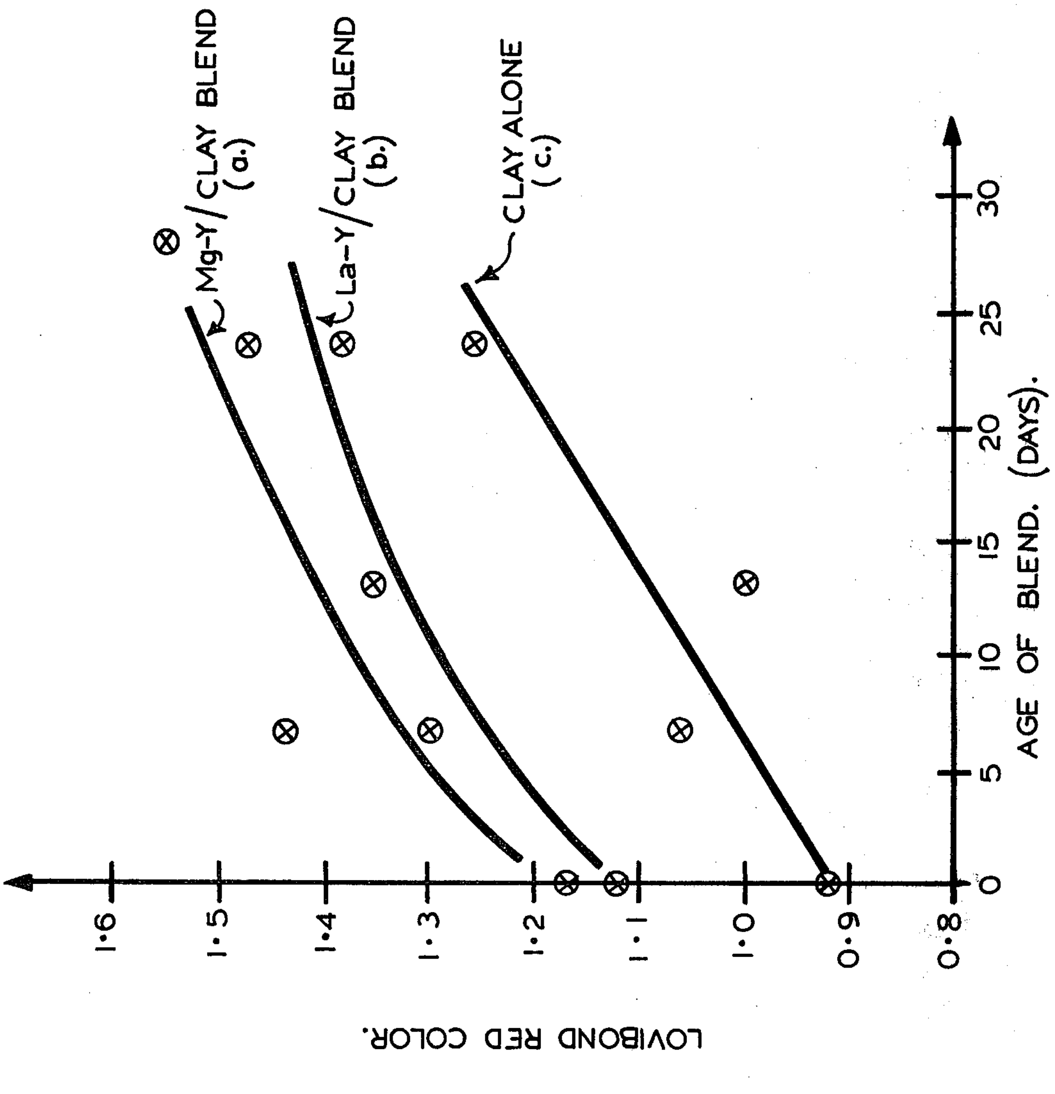
FIG. 1 provides a decolorizing comparison wherein (a) is a 10–90% by weight blend of acid-activated clay and Mg-Y zeolite.

In this example, blends of Mg-Y zeolite and La-Y zeolite (Analysis: $SiO_2$=60.9, $Al_2O_3$=19.55, $Na_2O$=3.55, La-oxide=13.65, $NO_3$=0.13%) with bleaching clay were prepared in the same manner as in the previous examples. These blends, together with an acid-activated clay control, were tested for bleaching and free fatty acid removal capacity. As can be seen from Table 6, the blends and the control were tested in freshly prepared condition, as well as regular intervals to determine the stability of the blends. The results are shown in the Table and also in FIGS. 1 and 2.

TABLE 6

| Test Day | Zeolite | Clay | Lovibond Red No. | FFA |
|---|---|---|---|---|
| 0 | 10% MgY | 90% | 1.16 | 0.51% |
| 0 | 10% LaY | 90% | 1.12 | 0.50% |
| 0 | none | 100% | 0.91 | 0.64% |
| 7 | 10% MgY | 90% | 1.43 | 0.51% |
| 7 | 10% LaY | 90% | 1.29 | 0.52% |
| 7 | none | 100% | 1.07 | 0.64% |
| 14 | 10% MgY | 90% | 1.37 | 0.51% |
| 14 | 10% LaY | 90% | 1.37 | 0.54% |
| 14 | none | 100% | 1.01 | 0.66% |
| 23 | 10% MgY | 90% | 1.46 | 0.50% |
| 23 | 10% LaY | 90% | 1.40 | 0.51% |
| 23 | none | 100% | 1.24 | 0.61% |

The preceding data demonstrate that the magnesium and lanthanum zeolites retain their efficiency for free fatty acid removal with substantially little or no change in their effect on the decolorization efficiency of the clay. In contrast, the sodium zeolite has a much greater inhibition of the decolorization efficiency of the clay when initially blended with the clay and this inhibition steadily increases with age. The effects of the blends of the zeolites on the properties of the clay can be seen also in FIGS. 1 and 2, where the decolorization capacities and the free fatty acid adsorption capacities, respectively, of the clay and the blends are illustrated.

The invention has been described with reference to the preceding examples which illustrate a preferred mode of practice of the invention. It is not intended that the invention be unduly limited by this disclosure of the preferred embodiments. Instead, the invention is intended to be defined by the components, and steps, and their obvious equivalents, set forth in the following claims.

We claim:

1. In the process of reducing the free fatty acis content of vegetable oils using a molecular sieve as treating agent, the improvement which comprises treating the vegetable oils, subsequent to the refining of the oils with an alkali metal hydroxide, with a free fatty acid removal and decolorizing composition consisting essentially of a major portion of an acid-activated subbentonite clay and a minor portion of a Y-zeolite, wherein the acid-activated clay component of the composition is in the range from about 75 to about 95% by weight and the Y-zeolite content is in the range from about 5 to about 25% by weight, the zeolite being characterized by a residual sodium ion content of less than about 5% by weight which residual sodium ion content is obtained by exchange of the balance of the sodium ions with cations of alkaline earth metals, lanthanides, transition metals other than Group VIII metals, or mixtures of these; separating the treated oils from the composition.

2. Process according to claim 1, wherein the decolorizing composition is added to the oil in an amount from about 0.5 to about 50% by volume based on the volume of oil treated.

3. Process according to claim 1, wherein the decolorizing treatment is accomplished at a temperature in the range of about 80° to about 180° C.

4. Process according to claim 1, wherein the contact time between the oil and the decolorizing composition is in the range from about 10 to about 30 minutes.

5. Process of claim 1, wherein the sodium ion content of the zeolite is in the range from about 2 to about 3.5% by weight.

6. Process of claim 1, wherein the exchange cation is calcium.

7. Process of claim 1, wherein the exchange cation is magnesium.

8. Process of claim 1, wherein the exchange cation is lanthanum.

9. Process of claim 1, wherein the zeolite content of the composition is in the range from about 7 to about 15% by weight.

* * * * *

UNITED STATES PATENT AND TRADEMARK OFFICE
CERTIFICATE OF CORRECTION

PATENT NO. : 4,443,379

DATED : April 17, 1984

INVENTOR(S) : Dennis R. Taylor and Zenon Demidowicz

It is certified that error appears in the above-identified patent and that said Letters Patent are hereby corrected as shown below:

Column 1, line 25, "chlorophill" should be --chlorophyll--

Column 1, line 39, "adsortive" should be --adsorptive--

Column 2, line 23, "metal-bentonites" should be --meta-bentonites--

Column 2, line 34, "andbeidellite" should be --and beidellite--

Column 2, line 48, "clays" should be --clay--

Column 4, line 12, "superatomospheric" should be --superatmospheric--

Column 4, line 51, "oils with which" should be --oils which--

Column 5, line 25, "ejection" should be --ejector--

Column 5, line 51, "5 6" should be --5.6--

Column 6, line 30, "through 200 mesh sieve)" should be --through a 200 mesh sieve)--

Column 6, line 42, "metal-exchanger" should be --metal-exchanged--

UNITED STATES PATENT AND TRADEMARK OFFICE

CERTIFICATE OF CORRECTION

PATENT NO. : 4,443,379

DATED : April 17, 1984

INVENTOR(S) : Dennis R. Taylor and Zenon Demidowicz

It is certified that error appears in the above-identified patent and that said Letters Patent are hereby corrected as shown below:

Column 7, line 21, "followinng" should be --following--

Column 7, line 49, "unbleached" should be --unblended--

Column 8, line 62, "acis" should be --acid--

Column 10, line 3, "range of about" should be --range from about--

Signed and Sealed this

*Fourteenth* Day of *May 1985*

[SEAL]

*Attest:*

DONALD J. QUIGG

*Attesting Officer* *Acting Commissioner of Patents and Trademarks*